United States Patent [19]
Hegde et al.

[11] Patent Number: 4,931,887
[45] Date of Patent: Jun. 5, 1990

[54] CAPACITIVE MEASUREMENT AND CONTROL OF THE FLY HEIGHT OF A RECORDING SLIDER

[75] Inventors: Suryanarayan G. Hegde, Hollowville; Robert A. Scranton, South Salem; Edward J. Yarmchuk, Mahopac, all of N.Y.

[73] Assignee: International Business Machines Corporation, Armonk, N.Y.

[21] Appl. No.: 151,134

[22] Filed: Feb. 1, 1988

[51] Int. Cl.$^5$ .......................... G11B 5/60; G11B 17/32
[52] U.S. Cl. ...................................... 360/75; 360/103; 324/662; 324/690
[58] Field of Search ................. 360/75, 102, 103, 109; 369/45, 126, 231, 233; 324/61 R, 662, 690

[56] References Cited

U.S. PATENT DOCUMENTS

| | | | |
|---|---|---|---|
| 3,201,526 | 8/1965 | Wessels et al. | 179/100 |
| 3,732,552 | 5/1973 | Walraven | 340/174 |
| 3,825,323 | 7/1974 | Landwer | 369/43 |
| 3,860,918 | 1/1975 | Cencel | 340/200 |
| 3,873,763 | 3/1975 | Janssen | 369/45 |
| 4,300,226 | 11/1981 | Barnette et al. | 369/45 |
| 4,468,087 | 3/1987 | Scranton et al. | 360/103 |
| 4,481,616 | 11/1984 | Matey | 369/58 |
| 4,556,597 | 12/1985 | Best et al. | 360/77.03 |
| 4,587,579 | 5/1986 | Cocke et al. | 360/75 |
| 4,605,977 | 8/1986 | Matthews | 360/103 |

FOREIGN PATENT DOCUMENTS

| | | |
|---|---|---|
| 0125478 | 11/1984 | European Pat. Off. . |
| 0162349 | 11/1985 | European Pat. Off. . |
| 0245199 | 1/1987 | European Pat. Off. . |
| 57-060566 | 4/1982 | Japan . |
| 62-159385 | 7/1987 | Japan . |

OTHER PUBLICATIONS

Carmichael, M. W. J. et al., "Capacitance Probe", *IBM Technical Disclosure Bulletin,* vol. 20, No. 11A, p. 4610 (Apr. 1978).
Cupp, J. C., "Capacitance Probe and Constant Q Circuit for . . . ", IBM Technical Disclosure Bulletin, vol. 22, No. 1, pp. 319–320 (Jun. 1979).
Klaassen, K. B., "Capacitive Servo Detector", *IBM Technical Disclosure Bulletin,* vol. 26, No. 6, pp. 2942–2946 (Nov. 1983).
Scranton, R. A. et al., "Multifrequency Phase-Encoded Position Patterns", *IBM Techn. Discl. Bull., vol. 27, No. 9, pp. 5390–5392 (Feb. 1985).*
Research Disclosure 20638 (Jun. 1981), Capacitive Height control for Maintaining a Magnetic Head Cloxly Spaced from a Magnetic Layer, No. 206, pp. 242–243.
Millman et al., "Motion Pictures of In-Situ Air Bearing Dynamics", *IEEE Trans. on Mag.,* vol. MAG-22, No. 5, Sep. 1986, pp. 1031–1033.
"Dynamic Fly Height Monitor", *IBM Tech. Discl. Bull.,* vol. 28, No. 11, Apr. 1986, pp. 5133–5135.
Heerens, "Multi-Terminal Capacitor Sensors", *J. Phy. E: Sci. Instrum,* vol. 15, No. 1, Jan. 1982, pp. 137–141.

*Primary Examiner*—Steven L. Stephan
*Assistant Examiner*—David L. Robertson
*Attorney, Agent, or Firm*—Marc D. Schechter

[57] ABSTRACT

A device and method for capacitive measurement and control of the fly height of a recording slider. A recording slider is vertically spaced from a rotating disk surface by an "air bearing". The disk has a first electrically conductive pattern at its surface. The first pattern has an edge with a length extending, for example, radially. The recording slider has one or more electrically conductive rails extending transverse to the radial pattern on the rotating disk. As the disk rotates, the edge of the pattern on the disk scans across the rail of the slider. By measuring the electrical capacitance between the slider and the pattern on the disk, and by processing the electrical capacitance measurement signal, a vertical spacing signal proportional to the vertical spacing between the disk and the slider can be obtained.

41 Claims, 6 Drawing Sheets

CAPACITIVE MEASUREMENT AND CONTROL OF THE FLY HEIGHT OF A RECORDING SLIDER

BACKGROUND OF THE INVENTION

The invention relates to direct access storage devices such as magnetic disk storage devices. In a magnetic disk storage device, a magnetic disk spins at a high speed while a magnetic recording transducer (a magnetic recording head) is suspended above the disk surface. The head is supported by a slider which floats above the magnetic disk on an "air bearing". The magnetic head writes information onto the magnetic disk in concentric circular tracks. Different tracks are accessed for writing or reading by changing the radial position of the magnetic recording head so as to position the head above the desired track.

One of the most important parameters in a high density magnetic disk storage device is the height (the fly height) of the magnetic recording head above the disk surface while the disk is spinning. Rapid and accurate measurement of this quantity is essential for the development of new slider designs. After the development of new slider designs, such fly height measurement is essential for slider manufacture.

It has been known, in general, to measure the fly height of a magnetic recording head by white light interferometry between a spinning transparent test disk and a slider flying above the test disk. While this technique is sufficiently precise for the current generation of products, the need to measure fly heights to accuracies of a fraction of a wavelength of light threatens to push past the limits of this measurement technique.

In another method of fly height measurement, the slider flies above the surface of an electrically conductive test disk. By measuring the capacitance between the electrically conductive slider and the electrically conductive disk, the fly height can be determined.

The known capacitance measurement technique suffers several drawbacks. Since the entire test disk is conductive, in order to be accurate this technique requires careful accounting for stray capacitance. Moreover, the known measurement technique provides only an average fly height measurement. It provides no detailed measurement of the fly height at different portions of the slider.

For example, the tilt of the slider with respect to the disk cannot be measured by the known capacitance technique. The tilt of the slider is important in order to determine the fly height of the trailing edge of the slider. The fly height of the trailing edge of the slider is important because the trailing edge of the slider is closest to the disk, and because the magnetic recording head is located at the trailing edge of the slider.

Further since the known capacitance measurement technique cannot determine the tilt of the slider, only the relative fly height can be determined. The absolute fly height cannot be determined by measuring the total capacitance between the slider and the conductive disk surface.

SUMMARY OF THE INVENTION

It is an object of the invention to provide a method and device for determining the vertical spacing between two objects (in particular a slider and a disk) with improved detail, precision, and accuracy.

It is another object of the invention to provide a method and device for measuring the fly height of a slider above a disk at a number of points along the length of the slider.

According to the invention, a device for determining the vertical spacing between two object comprises first and second vertically spaced objects. The first object has a first electrically conductive pattern at its surface. The first pattern has an edge with a length extending in a first direction.

The second object has a second electrically conductive pattern at its surface which is arranged opposite the surface of the first object in the vertical direction. The second pattern has a length extending in a second direction and a width extending in a third direction transverse to the second direction. The first and second objects are arranged such that the length of the edge of the first pattern is transverse to the length of the second electrically conductive pattern. The length of the edge of the first pattern exceeds the width of the second pattern.

The device further includes means for moving the first and second objects relative to one another so as to scan the edge of the first pattern across the second pattern. Means are provided for measuring the electrical capacitance between the first and second electrically conductive patterns. The measuring means produces an electrical measurement signal representing the electrical capacitance between the first and second electrically conductive patterns as a function of time.

Finally, means are provided for processing the electrical measurement signal to produce a vertical spacing signal proportional to the vertical spacing between the first and second objects.

In one embodiment of the invention, the first object is a rotatable body such as a disk. The second object is a slider.

In another aspect of the invention, the first pattern (e.g. on the disk) has a width which is less than the length of the edge of the second pattern (e.g. the slider).

Preferably, both the first and second patterns have constant widths.

Since the fly height is inversely proportional to the capacitance, the means for processing the measurement signal preferably includes means for inverting the electrical measurement signal in order to produce a vertical spacing signal.

In another aspect of the invention, both the first and second electrically conductive patterns extend in straight lines, one radially and the other tangentially.

In the invention, the first electrically conductive pattern may be, for example, an ion-implanted region in an electrically insulating substrate. The second electrically conductive pattern may be a ridge in a conductive block. The second pattern may then be the slider itself.

Alternatively, the first electrically conductive pattern may be, for example, an electrically conductive ridge on the planar surface on an electrically conductive disk.

In another embodiment of the invention, the means for processing the electrical measurement signal to produce the vertical spacing signal includes means for computing the first time derivative of the electrical measurement signal to produce a first time derivative signal. As explained further below, with the use of certain electrically conductive patterns on the rotating disk, the fly height of the slider is inversely related to the first time derivative of the capacitance between the slider and the electrically conductive pattern on the disk.

The invention further relates to a device for controlling the distance between two objects. Such a device includes first and second objects, moving means, measuring means, and processing means as described above. The device for controlling the distance between two objects further includes means for generating a reference signal representing a desired vertical spacing between the first and second objects, and means for receiving the reference signal and the vertical spacing signal and for changing the vertical spacing in response to the difference between the reference signal and the vertical spacing signal.

The invention also relates to a method of measuring the vertical spacing between first and second objects of the type described above. In the method, the first and second objects are moved relative to one another so as to scan the edge of the first pattern across the second pattern. The electrical capacitance between the first and second patterns is measured, and the resulting electrical measurement signal is processed to produce a vertical spacing signal proportional to the vertical spacing between the first and second objects.

In a magnetic recording device according to the present invention, the first object is a magnetic recording medium, and the second object is a magnetic recording head assembly. The magnetic recording device further includes moving means, measuring means, processing means, reference signal generating means, and means responsive to the difference between the reference signal and the vertical spacing signal, all as described above.

Finally, the invention relates to a device for measuring the fly height of a magnetic recording head which is arranged on an electrically conductive slider. Such a device comprises a rotatable body with a first electrically conductive pattern having an edge extending in a first direction. Means are provided for rotating the rotatable body in a direction of rotation around an axis substantially perpendicular to the surface of the rotatable body. The direction of rotation is transverse to the edge of the first electrically conductive pattern.

The device further includes measuring means and processing means of the types described above.

The method and devices according to the present invention are advantageous because by providing a first electrically conductive pattern with an edge extending transverse to the direction of relative motion between the first and second objects, the point-by-point vertical spacing between the two objects can be determined both accurately and in absolute terms.

DESCRIPTION OF THE PREFERRED EMBODIMENTS

Figure 1:
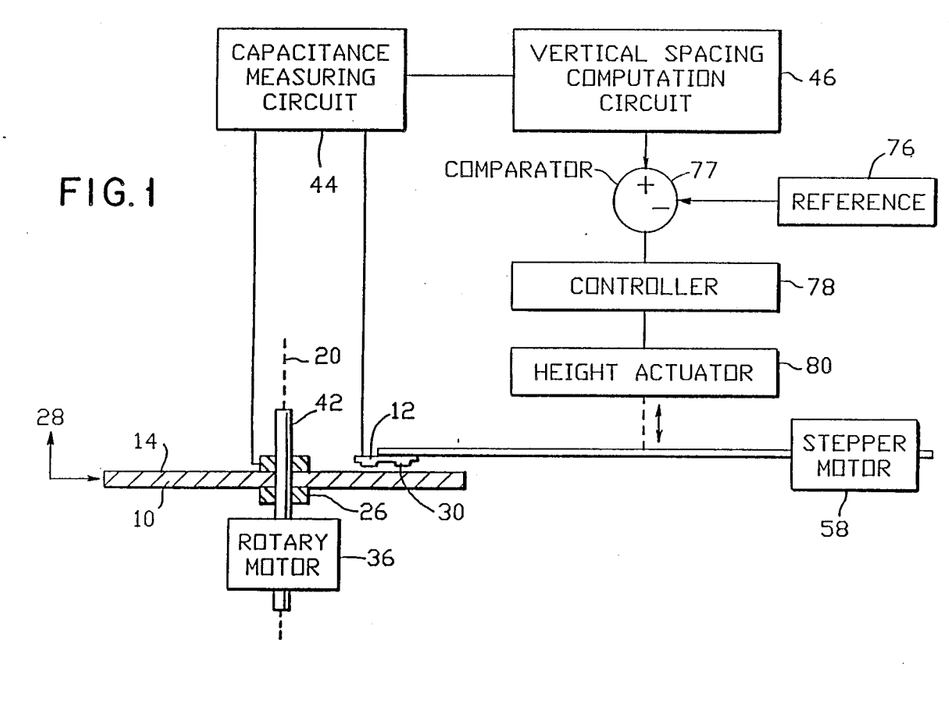
FIG. 1 is a schematic diagram of a vertical spacing measurement and control device according to the present invention.
Figure 2:
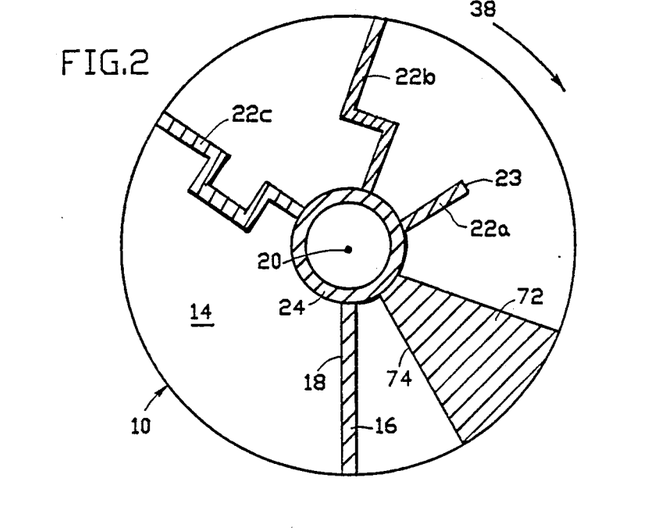
FIG. 2 is a top plan view of a disk-shaped first object having several examples of electrically conductive patterns on the surface thereof.

Referring to FIG. 1, the device for determining the vertical spacing between two objects comprises a first object 10 and a second object 12. The first object 10 is, for example, a disk as shown in FIG. 2. The disk 10 has a surface 14 with a first electrically conductive pattern.

The electrically conductive pattern at the surface 14 of disk 10 has an edge with a length extending in a first direction. For example, the pattern 16 has an edge 18 which extends in a radial direction with respect to the axis 20 of disk 10.

In general, the first electrically conductive pattern on the surface 14 of disk 10 may take many different forms. For example, the width and/or the length of the pattern may be increased or decreased. If desired, the pattern may have one or more azimuthal jogs. Several alternative patterns 22a, 22b, 22c, and 72 are shown in FIG. 2.

In order to provide an electrical connection to the electrically conductive pattern or patterns, an electrically conductive ring 24 is provided at the inside diameter of the disk 10. The electrically conductive ring 24 is connected to capacitance measuring circuitry (described below) by way of a disk clamp 26 (FIG. 1).

Still referring to FIG. 1, the second object 12 has a surface arranged opposite the surface 14 of the disk 10. The second object 12 may be, for example, a recording slider.

The surface of the recording slider 12 is spaced from the surface 14 of the disk 10 in a vertical direction 28.

Figure 4:
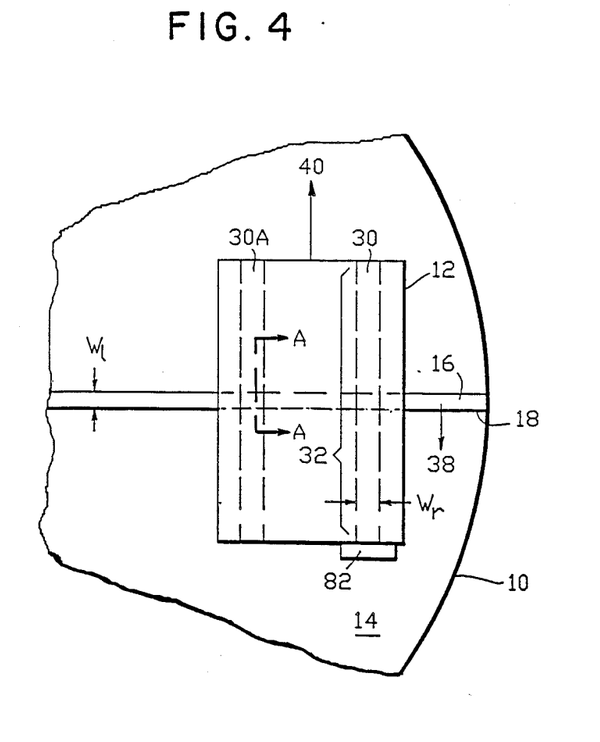
FIG. 4 is a top plan view, partially in phantom of a slider flying above a rotating disk.

The recording slider 12 has a second electrically conductive pattern at its surface. As shown in FIG. 1, the second pattern 30 is a ridge or rail on the electrically conductive slider 12. As shown in FIG. 4, the ridge 30 has a length extending in a second direction 32 transverse to the length of the edge 18 of the first pattern 16 on disk 10. The second pattern 30 has a width $w_r$ extending in a third direction transverse to the length direction 32. The length of the edge 18 of the first pattern 16 exceeds the width $w_r$ of the second pattern 30.

In order to improve the flying stability of the slider 12, the slider 12 is preferably provided with a second ridge or rail 30A. Rail 30A is parallel to rail 30, and has the same physical dimensions as rail 30. The two rails 30 and 30A may together constitute the second electrically conductive pattern.

As shown in FIGS. 1 and 4, the invention also includes means 36 for moving the first object 10 and the second object 12 relative to one another in a direction transverse to the vertical direction 28 and transverse to the edge 18 of the first pattern 16 so as to scan the edge 18 of the first pattern 16 across the second pattern 30 and 30A. The means 36 may move the disk 10 in the direction of the arrow 38 and/or may move the slider 12 in the direction of the arrow 40. (FIG. 4.)

Preferably, the means 36 for moving the first and second objects relative to one another comprises a rotary motor 36 as shown in FIG. 1. The disk 10 is clamped to the shaft 42 of motor 36 by way of the disk clamp 26.

An electrical capacitance measuring circuit 44 is provided for measuring the electrical capacitance between the first pattern 16 on the disk 10 and the second pattern 30 and 30A on the slider 12 as the edge 18 of the first pattern 16 scans across the second pattern 30 and 30A. A vertical spacing computation circuit 46 processes the electrical measurement signal from the capacitance measuring circuit 44 to produce a vertical spacing signal proportional to the vertical spacing between the first object 10 and the second object 12.

Figure 3:
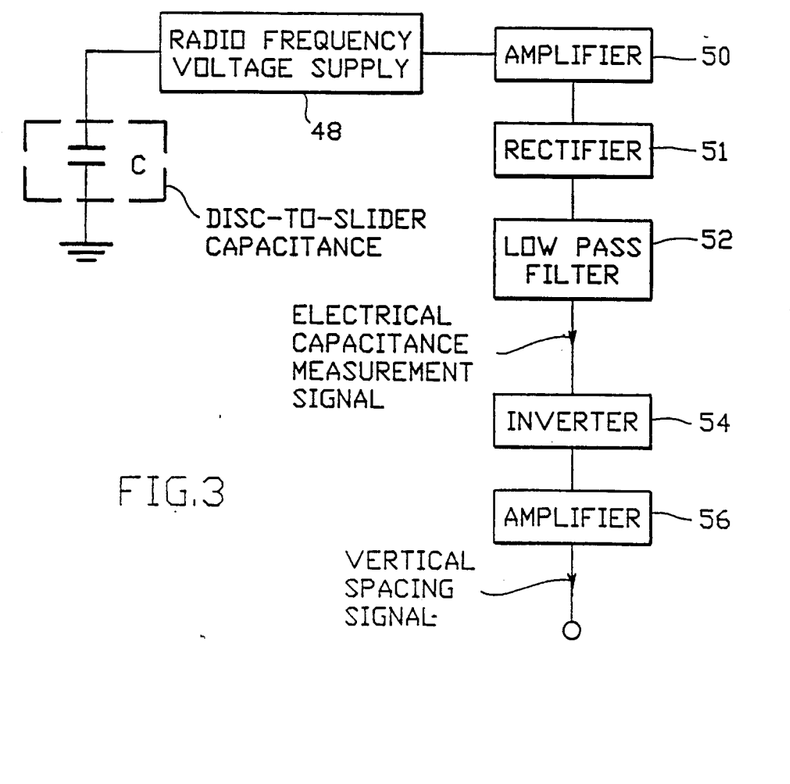
FIG. 3 is a block diagram of a means for measuring the electrical capacitance between first and second electrically conductive patterns and a first embodiment of means for processing the electrical measurement signal to produce a vertical spacing signal.

Embodiments of the capacitance measuring circuit 44 and the vertical spacing computation circuit 46 are shown in FIG. 3. The capacitance measuring circuit 44 comprises, for example, a radio frequency voltage supply 48, an amplifier 50, a rectifier 51 and a low pass filter 52. The radio frequency (RF) voltage from voltage supply 48 may be, for example, one volt rms at 4 megahertz. The radio frequency voltage, V, generates a current I in the disk-to-slider capacitance according to the relationship $$I = 2\pi f C V, \quad (1)$$

where f is the frequency of the RF voltage, and C is the capacitance between the slider and the electrically conductive pattern on the disk.

Both the supplied voltage and the disk-to-slider capacitance vary with time. The voltage varies because the voltage supply 48 supplies a radio frequency varying voltage. The capacitance varies because the edge 18 of the first pattern 16 is scanned across the second pattern 30 and 30A. In order to remove the frequency component due to the supplied RF voltage, the frequency of voltage supply 48 is chosen to be much larger than the frequency of the capacitance variation. The low pass filter 52 then removes the high frequency variation of the current to produce an electrical capacitance measurement signal.

The vertical spacing computation circuit 46 of FIG. 1 may comprise, for example, an inverter 54 and an amplifier 56 as shown in FIG. 3.

Figure 5:
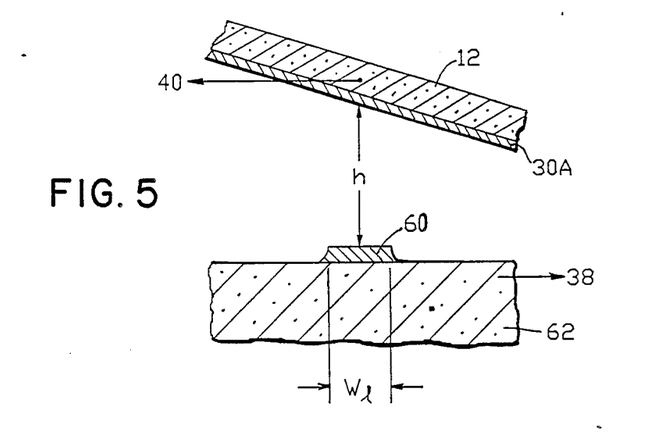
FIG. 5 is a cross-sectional view along the line A—A of FIG. 4 of a first embodiment of a disk bearing a first electrically conductive pattern according to the present invention.
Figure 6:
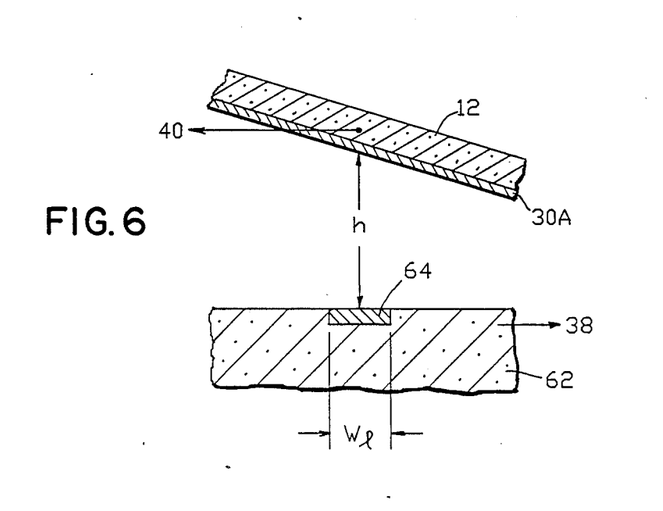
FIG. 6 is a cross-sectional view along the line A—A of FIG. 4 of a second embodiment of a disk bearing a first electrically conductive pattern according to the invention.

The circuit 46 of FIG. 3 is suitable for determining the vertical spacing between the first pattern 16 on the rotating disk 10 and the second pattern 30 and 30A on the slider 12 as shown in FIGS. 4, 5, and 6. In this embodiment of the invention, the capacitance is given by the equation $$C = \frac{2\epsilon_0 w_r w_1}{h} \quad (2)$$

where $w_1$ is the width of the conducting line (the first pattern) 16, $w_r$ is the width of the rail (the second pattern 30 and 30A), $\epsilon_0$ is the permittivity of free space, and h is the fly height of the rail above pattern 16 (FIG. 4), 60 (FIG. 5), or 64 (FIG. 6). The factor of two is due to the second rail 30A, which has the same width and fly height as the rail 30. Thus, at any point in time, the fly height h is inversely proportional to the capacitance between the disk 10 and the slider 12.

Preferably, the surfaces of the disk 10 and the rails 30 and 30A of the slider 12 are substantially planar. In this way, accurate local measurements of the fly height of the rails 30 and 30A, and hence accurate tilt measurements can be obtained.

Returning to FIG. 1, the invention may further include a stepper motor 58 for moving the slider 12 in the radial direction with respect to the axis 20 passing through the center of the disk 10. The fly height of the slider 12 may then be measured at different radial positions of the slider 12.

Moreover, if the first pattern is appropriately shaped (see, for example, patterns 22a, 22b, and 22c in FIG. 2), it becomes possible to separately measure the disk-to-slider capacitance of rail 30 or rail 30A. For example, by appropriately positioning slider 12, the pattern 22a can be made to scan only the rail 30A. Alternatively, pattern 22b or 22c can successively scan rails 30 and 30A by suitably adjusting the radial position of slider 12.

The first object or disk 10 and its electrically conductive pattern may have a number of alternative constructions. The disk 10, may, for example, be an electrically insulating material such as Photoceram. Alternatively, the disk 10 may be a metallic conductor.

Whether the disk 10 is electrically insulating or electrically conductive, the first pattern 16 may be an electrically conductive ridge 60 on the disk substrate 62, as shown in FIG. 5. Ridge 60 may be, for example, a 400 Angstrom thick line having a width of 250 microns. Experiments have shown that such a raised pattern thickness does not significantly perturb the slider fly height.

Nevertheless, planarized conductor patterns may alternatively be used. As shown in FIG. 6, the disk 10 comprises a conductor pattern 64 embedded in disk substrate 62. The disk substrate 62 in this embodiment may be a silicon disk. The planarized conductor pattern 64 may be fabricated by ion implantation to create doped conducting regions in the silicon substrate 62. Planarized conductor pattern 64 may be, for example, 100 to 500 Angstrom thick.

It is alternatively possible to cover the pattern 16 with, for example, a layer of nonconductive magnetizable material. In such a case, however, in order to calculate the fly height it would be necessary to know the thickness of the covering layer, and the dielectric constant of the covering layer.

Figure 7:
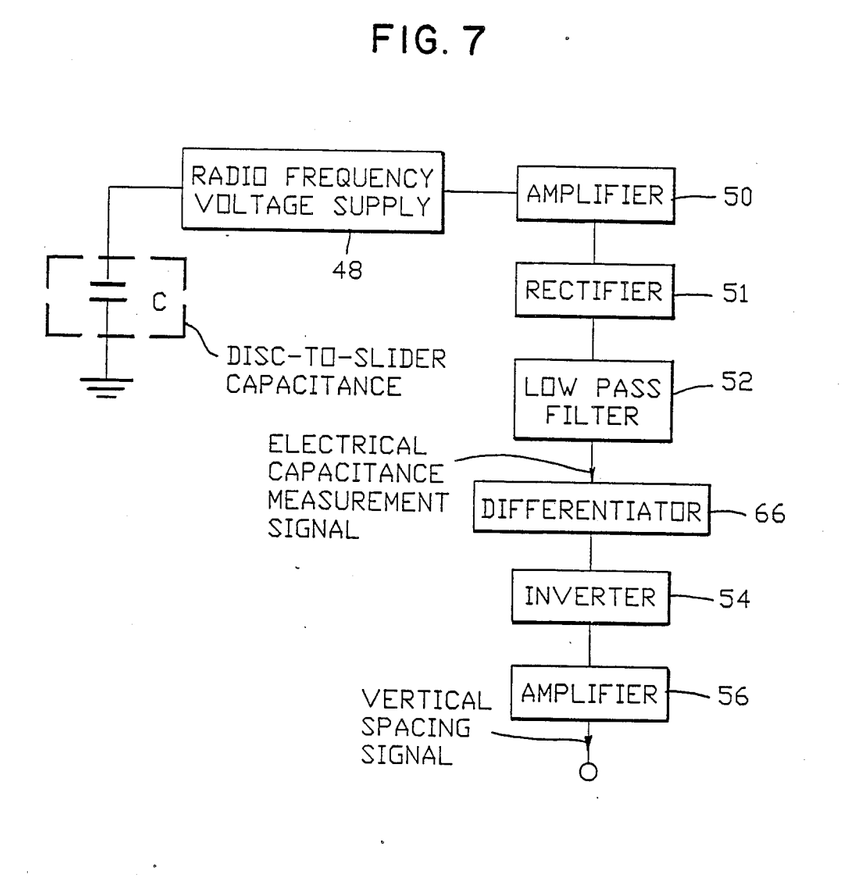
FIG. 7 is a block diagram of a means for measuring the electrical capacitance between first and second electrically conductive patterns on first and second spaced objects, and a second embodiment of means for processing the electrical measurement signal to produce a vertical spacing signal.

In a second embodiment of the invention, the capacitive measuring circuit 44 and the vertical spacing computation circuit 46 of FIG. 1 are shown in more detail in FIG. 7. As in the first embodiment of the invention, the capacitance measuring circuit 44 comprises a radio frequency voltage supply 48, an amplifier 50, a rectifier 51 and a low pass filter 52. However, the vertical spacing computation circuit 46 now comprises a differentiator 66 in addition to the inverter 54, and the amplifier 56.

The circuitry of FIG. 7 can be used with the electrically conductive pattern 72 on disk 10. (See, FIG. 2.) In this case, pattern 72 has a width greater than the lengths of rails 30 and 30A. Therefore, as the edge 74 of pattern 72 is scanned across the rails 30 and 30A of slider 12, the point-by-point capacitance along the rails 30 and 30A is proportional to the first time derivative of the total capacitance C between the pattern 72 and the rails 30 and 30A. Thus, $$C = \frac{4\epsilon_0 w_r vt}{h(t) + h_0} \quad (3)$$

where v is the velocity of the edge 74 of the pattern 72 as it scans across the rails 30 and 30A, where t is the time, where h(t) is height of the rails above the edge 74 at time t, and where $h_0$ is the height of the leading edges of the rails. Therefore, $$\frac{dC}{dt} \approx \frac{4\epsilon_0 w_r v}{h(t)}. \quad (4)$$

This approximation holds true when $$t \frac{dh}{dt}$$

(the rise or fall of the slider is) much less than the sum of the heights of the leading and trailing edges of the rails, which is a good approximation in many cases. Consequently, the point-by-point fly height of the rails 30 and 30A is inversely proportional to the first time derivative of the disk-to-slider capacitance.

It is also possible to measure the height of rail 30 or 30A across the width of the rail. Such measurement can be made by scanning the rail radially across the edge 23 of pattern 22a while the disk 10 is rotating. We then measure the capacitance C as a function of the angular position θ of disk 10 and of a time T equal to INT(νt) (where INT is the integer function, ν is the frequency of rotation, and t is the "absolute" time). By computing the partial derivative of C with respect to T at each position θ (for example by taking the difference between two successive fly height signals) the height across the width of the rail can be obtained.

Thus far, we have described a device for measuring the vertical spacing between two objects. The invention may also control the distance between the two objects. To this end, the invention further comprises means for generating a reference signal representing a desired vertical spacing between the first and second objects, and means for receiving the reference signal and the vertical spacing signal, and for changing the vertical spacing between the first and second objects in response to the difference between the reference signal and the vertical spacing signal.

As shown in FIG. 1, the means for generating a reference signal may be any voltage reference source 76. A comparator 77 subtracts the reference signal from the vertical spacing signal to produce a difference signal.

A controller 78 may be provided for receiving the difference signal and for controlling the height of slider 12 in response to the difference between the reference signal and the vertical spacing signal. Height controller 78 may comprise a proportional-integral-derivative (PID) control circuit. The output of controller 78 regulates a height actuator 80 which raises or lowers the height of the slider 12. The height actuator 80 may be, for example, a motor and screw, a piezoelectric element, a stepper motor, a voice coil motor, or some other suitable mechanical arrangement.

In a magnetic recording device according to the present invention, the surface 14 of the disk 10 is a magnetic recording medium. The slider 12 carries a magnetic recording head 82 (FIG. 4) at the trailing edge of the slider 12.

In a device for measuring the fly height of a magnetic recording head, the magnetic recording head 82 is arranged on the electrically conductive slider 12. The measurement device includes a rotatable body, which may be a test disk 10 having no magnetic recording medium on the surface thereof.

EXAMPLE

The capacitance was measured between a slider and an electrically conductive line on a rotating disk. The slider had two rails having widths of 400 microns and lengths of 4000 microns. The line had a width of 250 microns. Only the inner rail was scanned by the line.

Figure 8:
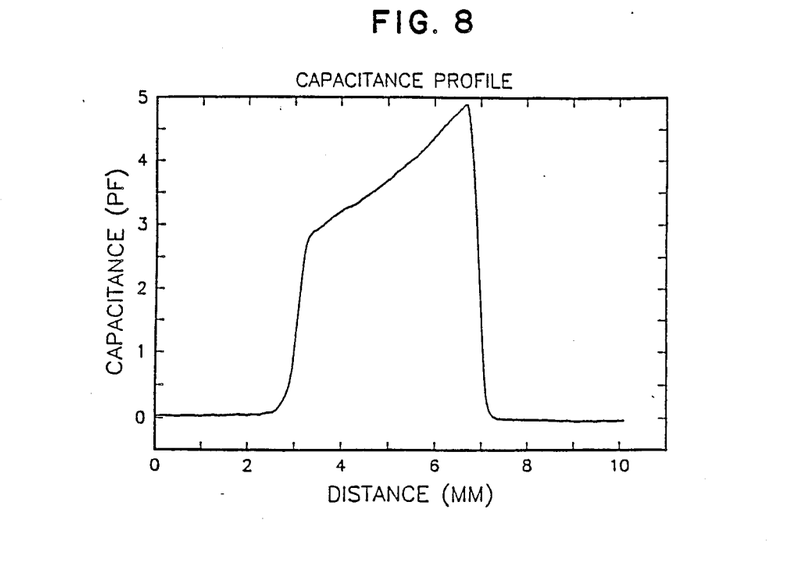
FIG. 8 is a graph of the measured capacitance between a recording slider and an electrically conductive line on a rotating disk. The capacitance is plotted versus the distance along the length of the slider.
Figure 9:
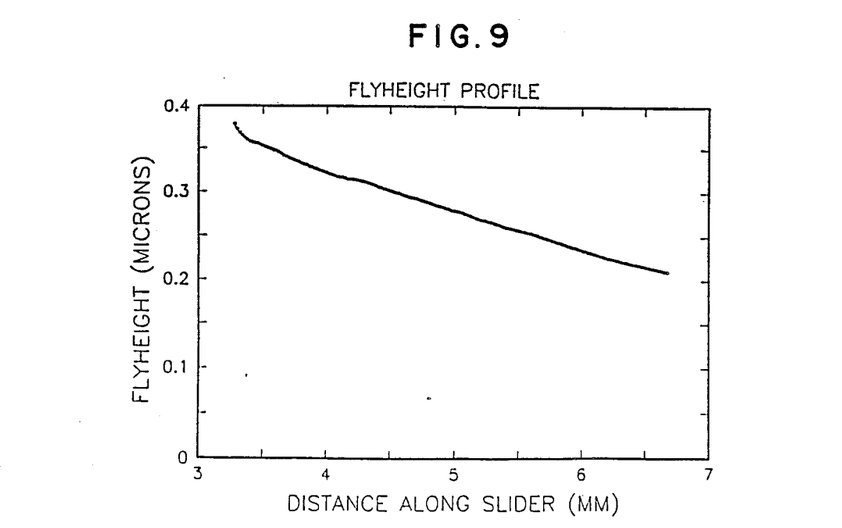
FIG. 9 is a graph of the slider fly height calculated from the capacitance data of FIG. 8.

FIG. 8 shows the measured capacitance versus the distance along the length of the rail. FIG. 9 shows the fly height profile calculated from the capacitance curve of FIG. 8. The pitch or tilt of the slider is evident. The fly height of the trailing edge can be seen to be approximately 0.2 microns.

What is claimed is:

1. A device for determining the vertical spacing between two objects, said device comprising:

a first object having a surface, said first object having a first electrically conductive pattern at its surface, said first pattern having an edge with a length extending in a first direction, said first pattern having a width transverse to the length of the edge of the first pattern;

a second object having a surface arranged opposite the surface of the first object, the surface of the second object being spaced from the surface of the first object in a vertical direction, said second object having a second electrically conductive pattern at its surface, said second pattern having a length extending in a second direction and a width extending in a third direction transverse to the second direction, said first and second objects being arranged such that the length of the edge of the first pattern is transverse to the length of the second electrically conductive pattern, the length of the edge of the first pattern exceeding the width of the second pattern, the width of the first pattern being less than the length of the second pattern;

means for moving said first and second objects relative to one another in a direction transverse to the vertical direction and transverse to the edge of the first pattern so as to scan the edge of the first pattern across the second pattern;

means for measuring the electrical capacitance between the first and second electrically conductive patterns, said measuring means producing an electrical measurement signal proportional to the electrical capacitance between the first and second electrically conductive patterns as a function of time; and means for processing the electrical measurement signal to produce a vertical spacing signal proportional to the vertical spacing between the first and second objects, said means for processing the electrical measurement signal comprising means for computing the first time derivative of the electrical measurement signal to produce a first time derivative signal proportional to the vertical spacing between the first and the second objects.

2. A device as claimed in claim 1, characterized in that the means for processing the electrical measurement signal comprises means for inverting the first time derivative signal to produce a vertical spacing signal proportional to the vertical spacing between the first and second objects.

3. A device as claimed in claim 2, characterized in that:
   the width of the first pattern is constant along the entire length of the edge of the first pattern; and
   the width of the second pattern is constant along the entire length of the second pattern.

4. A device as claimed in claim 3, characterized in that:
   the surfaces of the first and second objects are substantially planar;
   the first object is rotatable around an axis substantially perpendicular to the planar surface at a first rate of rotation;
   the length of the edge of the first electrically conductive pattern extends in a radial direction with respect to the axis of rotation;
   the second object is rotatable around the axis at a second rate of rotation different from the first rate of rotation; and
   the length of the second electrically conductive pattern extends tangential to the radial direction.

5. A device as claimed in claim 4, characterized in that the second object is movable in the radial direction but is not rotatable around the axis.

6. A device as claimed in claim 5, characterized in that:
   the first electrically conductive pattern extends in a straight line in the radial direction; and
   the second electrically conductive pattern extends in a straight line substantially perpendicular to the radial direction.

7. A device as claimed in claim 6, characterized in that:
   the first object is made of an electrically insulating material;
   the first electrically conductive pattern comprises an ion-implanted region in the first object;
   the second object is made of an electrically conductive material; and
   the second electrically conductive pattern comprises an electrically conductive ridge having a height extending in the direction of the first object.

8. A device as claimed in claim 6, characterized in that:
   the first object is made of an electrically conductive material;
   the first electrically conductive pattern comprises an electrically conductive ridge on the planar surface of the first object, said projection having a height extending in the direction of the second object;
   the second object is made of an electrically conductive material; and
   the second electrically conductive pattern comprises an electrically conductive ridge having a height extending in the direction of the first object.

9. A device for determining the vertical spacing between two objects, said device comprising:
   a first object having a surface, said first object having a first electrically conductive pattern at its surface, said first pattern having an edge with a length extending in a first direction;
   a second object having a surface arranged opposite the surface of the first object, the surface of the second object being spaced from the surface of the first object in a vertical direction, said second object having a second electrically conductive pattern at its surface, said second pattern having a length extending in a second direction and a width extending in a third direction transverse to the second direction, said first and second objects being arranged such that the length of the edge of the first pattern is transverse to the length of the second electrically conductive pattern;
   means for moving said first and second objects relative to one another in a direction transverse to the vertical direction and transverse to the edge of the first pattern so as to scan the edge of the first pattern across the second pattern;
   means for measuring the electrical capacitance between the first and second electrically conductive patterns, said measuring means producing an electrical measurement signal proportional to the electrical capacitance between the first and second electrically conductive patterns as a function of time; and
   means for processing the electrical measurement signal to produce a vertical spacing signal proportional to the vertical spacing between the first and second objects, said means for processing the electrical measurement signal comprising means for computing the first time derivative of the electrical measurement signal to produce a first time derivative signal.

10. A device as claimed in claim 9, characterized in that the means for processing the electrical measurement signal comprises means for inverting the first time derivative signal to produce a vertical spacing signal proportional to the vertical spacing between the first and second objects.

11. A device as claimed in claim 10, characterized in that:
    the first pattern has a width transverse to the length of the edge of the first pattern; and
    the width of the first pattern is greater than the length of the second pattern.

12. A device as claimed in claim 11, characterized in that the width of the second pattern is constant along the entire length of the second pattern.

13. A device as claimed in claim 12, characterized in that:
    the surfaces of the first and second objects are substantially planar;
    the first object is rotatable around an axis substantially perpendicular to the planar surface at a first rate of rotation;
    the length of the edge of the first electrically conductive pattern extends in a radial direction with respect to the axis of rotation;
    the second object is rotatable around the axis at a second rate of rotation different from the first rate of rotation; and
    the length of the second electrically conductive pattern extends tangential to the radial direction.

14. A device as claimed in claim 13, characterized in that the second object is movable in the radial direction but is not rotatable around the axis.

15. A device as claimed in claim 14, characterized in that:
    the edge of the first electrically conductive pattern extends in a straight line in the radial direction; and the second electrically conductive pattern extends in a straight line substantially perpendicular to the radial direction.

16. A device as claimed in claim 15, characterized in that:
the first object is made of an electrically insulating material; and
the first electrically conductive pattern comprises an ion-implanted region in the first object.

17. A device as claimed in claim 15, characterized in that:
the first object is made of an electrically conductive material; and
the first electrically conductive pattern comprises an electrically conductive ridge on the planar surface of the first object, said projection having a height extending in the vertical direction.

18. A device for controlling the distance between two objects, said device comprising:
a first object having a surface, said first object having a first electrically conductive pattern at its surface, said first pattern having an edge with a length extending in a first direction;
a second object having a surface arranged opposite the surface of the first object, the surface of the second object being spaced from the surface of the first object in a vertical direction, said second object having a second electrically conductive pattern at its surface, said second pattern having a length extending a second direction and a width extending in a third direction transverse to the second direction, said first and second objects being arranged such that the length of the edge of the first pattern is transverse to the length of the second electrically conductive pattern;
means for moving said first and second objects relative to one another in a direction transverse to the vertical direction and transverse to the edge of the first pattern so as to scan the edge of the first pattern across the second pattern;
means for measuring the electrical capacitance between the first and second electrically conductive patterns, said measuring means producing an electrical measurement signal proportional to the electrical capacitance between the first and second electrically conductive patterns as a function of time;
means for processing the electrical measurement signal to produce a vertical spacing signal proportional to the vertical spacing between the first and second objects, said means for processing the electrical measurement signal comprising means for computing the first time derivative of the electrical measurement signal to produce a first time derivative signal proportional to the vertical spacing between the first and second objects;
means for generating a reference signal representing a desired vertical spacing between the first and second objects; and
means for receiving the reference signal and the vertical spacing signal and for changing the vertical spacing between the first and second objects in response to the difference between the reference signal and the vertical spacing signal.

19. A method of measuring the vertical spacing between two objects, said method comprising the steps of:
providing a first object having a surface, said first object having a first electrically conductive pattern at its surface, said first pattern having an edge with a length extending in a first direction;
providing a second object having a surface arranged opposite the surface of the first object, the surface of the second object being spaced from the surface of the first object in a vertical direction, said second object having a second electrically conductive pattern at its surface, said second pattern having a length extending in a second direction and a width extending in a third direction transverse to the second direction;
arranging said first and second objects such that the length of the edge of the first pattern is transverse to the length of the second electrically conductive pattern, the length of the edge of the first pattern exceeding the width of the second pattern;
moving said first and second objects relative to one another in a direction transverse to the vertical direction and transverse to the edge of the first pattern so as to scan the edge of the first pattern across the second pattern;
measuring the electrical capacitance between the first and second electrically conductive patterns, said measuring means producing an electrical measurement signal proportion to the electrical capacitance between the first and second electrically conductive patterns as a function of time; and
processing the electrical measurement signal to produce a vertical spacing signal proportional to the vertical spacing between the first and second objects, said processing comprising computing the first time derivative of the electrical measurement signal to produce a first time derivative signal proportional to the vertical spacing between the first and second objects.

20. A magnetic recording device comprising:
a magnetic recording medium having a surface, said magnetic recording medium having a first electrically conductive pattern at its surface, said first pattern having an edge with a length extending in a first direction;
a magnetic recording head assembly having a surface arranged opposite the surface of the magnetic recording medium, the surface of the recording head assembly being spaced from the surface of the recording medium in a vertical direction, said magnetic recording head assembly having a second electrically conductive pattern at its surface, said second pattern having a length extending in a second direction and a width extending in a third direction transverse to the second direction, said magnetic recording medium and magnetic recording head assembly being arranged such that the length of the edge of the first pattern is transverse to the length of the second electrically conductive pattern:
means for moving said magnetic recording head assembly and magnetic recording medium relative to one another in a direction transverse to the vertical direction and transverse to the edge of the first pattern so as to scan the edge of the first pattern across the second pattern;
means for measuring the electrical capacitance between the first and second electrically conductive patterns, said measuring means producing an electrical measurement signal proportional to the electrical capacitance between the first and the second electrically conductive patterns as a function of time;

means for processing the electrical measurement signal to produce a vertical spacing signal proportional to the vertical spacing between the magnetic recording head assembly and the magnetic recording medium, said means for processing the electrical measurement signal comprising means for computing the first time derivative of the electrical measurement signal to produce a first time derivative signal proportional to the vertical spacing between the magnetic recording head assembly and the magnetic recording medium;

means for generating a reference signal representing a desired vertical spacing between the magnetic recording head assembly and the magnetic recording medium; and means for receiving the reference signal and the vertical spacing signal and for changing the vertical spacing between the magnetic recording head assembly and the magnetic recording medium in response to the difference between the reference signal and the vertical spacing signal.

21. A device as claimed in claim 20, characterized in that the magnetic recording medium comprises a layer of magnetizable material on the surface of the magnetic recording medium, a part of said layer of magnetizable material being arranged between the first electrically conductive pattern and the magnetic recording head assembly.

22. A device as claimed in claim 21, characterized in that the magnetic recording head assembly comprises:
an electrically conductive slider forming the second electrically conductive pattern; and
a magnetic recording head arranged on the slider.

23. A device for measuring the fly height of a magnetic recording head, said magnetic recording head being arranged on an electrically conductive slider, said device comprising:
a rotatable body having a substantially planar surface, said rotatable body having a first electrically conductive pattern on the surface, said first pattern having an edge extending in a first direction;
means for rotating the rotatable body in a direction of rotation around an axis substantially perpendicular to the surface of the rotatable body, said direction of rotation being transverse to the edge of the first electrically conductive pattern;
means for measuring the electrical capacitance between the first electrically conductive pattern and a slider spaced from the surface of the rotatable body in a vertical direction, said measuring means producing an electrical measurement signal;
means for processing the electrical measurement signal to produce a fly height signal representing the vertical spacing between the first electrically conductive pattern and the electrically conductive slider, said means for processing the electrical measurement signal comprising means for computing the first time derivative of the electrical measurement signal to produce a first time derivative signal proportional to the vertical spacing between the first electrically conductive pattern and the electrically conductive slider.

24. A device as claimed in claim 23, characterized in that:
the first pattern has a width transverse to the length of the edge of the first pattern;
the slider has a length extending transverse to the first direction; and
the width of the first pattern is less than the length of the slider.

25. A device as claimed in claim 24, characterized in that the means for processing the electrical measurement signal comprises means for inverting the electrical measurement signal to produce a vertical spacing signal proportional to the vertical spacing between the first and second objects.

26. A device as claimed in claim 25, characterized in that:
the width of the first pattern is constant along the entire length of the edge of the first pattern; and
the slider has a length and a width, the width being constant along the entire length of the slider.

27. A device as claimed in claim 26, characterized in that the slider has a substantially planar surface.

28. A device as claimed in claim 27, characterized in that the slider is movable radially with respect to the axis, but is not rotatable around the axis.

29. A device as claimed in claim 28, characterized in that:
the first electrically conductive pattern extends in a straight line in the radial direction; and
the slider extends in a straight line substantially tangential to the radial direction.

30. A device as claimed in claim 29, characterized in that:
the rotatable body is made of an electrically insulating material;
the first electrically conductive pattern comprises an ion-implanted region in the rotatable body;
the slider is made of an electrically conductive material and comprises an electrically conductive ridge having a height extending in the direction of the first object.

31. A device as claimed in claim 29, characterized in that:
the rotatable body is made of an electrically conductive material;
the first electrically conductive pattern comprises an electrically conductive ridge on the planar surface of the rotatable body, said ridge having a height extending in the direction of the slider; and
the slider is made of an electrically conductive material and comprises an electrically conductive ridge having a height extending in the direction of the first object.

32. A device as claimed in claim 23, characterized in that the means for processing the electrical measurement signal comprises means for inverting the first time derivative signal to produce a vertical spacing signal proportional to the vertical spacing between the first and second objects.

33. A device as claimed in claim 32, characterized in that:
the first pattern has a width transverse to the length of the edge of the first pattern;
the slider has a length transverse to the first direction; and
the width of the first pattern is greater than the length of the slider.

34. A device as claimed in claim 33, characterized in that the width of the slider is constant along the entire length of the slider.

35. A device as claimed in claim 34, characterized in that the slider has a substantially planar surface.

36. A device as claimed in claim 33, characterized in that the slider is movable radially with respect to the axis, but is not rotatable around the axis.

37. A device as claimed in claim 36, characterized in that:
the edge of first electrically conductive pattern extends in a straight line in the radial direction; and
the slider extends in a straight line substantially tangential to the radial direction.

38. A device as claimed in claim 37, characterized in that:
the rotatable body is made of an electrically conductive material; and
the first electrically conductive pattern comprises an ion-implanted region in the rotatable body.

39. A device as claimed in claim 37, characterized that:
the rotatable body is made of an electrically conductive material; and
the first electrically conductive pattern comprises an electrically conductive ridge on the planar surface of the rotatable body, said projection having a height extending in the vertical direction.

40. A device for determining the vertical spacing between two objects, said device comprising:
a first object having a surface, said first object having a first electrically conductive pattern at its surface, said first pattern having a length extending in a first direction, said pattern having a width extending in a second direction transverse to the first direction;
a second object having a surface arranged opposite the surface of the first object, the surface of the second object being spaced from the surface of the first object in a vertical direction, said second object having a second electrically conductive pattern at its surface, said second pattern having a length extending in the second direction and a width extending in the first direction, the length of the first pattern exceeding the width of the second pattern, the length of the second pattern exceeding the width of the first pattern;
means for moving said first and second objects relative to one another in the second direction so as to scan the first pattern across the second pattern;
means for measuring the electrical capacitance between the first and second electrically conductive patterns, said measuring means producing an electrical measurement signal representing the electrical capacitance between the first and second electrically conductive patterns as a function of time; and
means for processing the electrical measurement signal to produce a vertical spacing signal proportional to the vertical spacing between the first and second objects.

41. A device as claimed in claim 40, characterized in that the second object comprises a magnetic recording slider having two air bearing rails comprising the second electrically conductive pattern.

* * * * *